US008462492B2

(12) United States Patent
Wu et al.

(10) Patent No.: US 8,462,492 B2
(45) Date of Patent: Jun. 11, 2013

(54) SLIDING MODULE FOR ELECTRONIC DEVICE

(75) Inventors: Ke-Long Wu, Shenzhen (CN); Chao Duan, Shenzhen (CN); Chia-Hua Chen, Shindian (TW)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 156 days.

(21) Appl. No.: 13/213,447

(22) Filed: Aug. 19, 2011

(65) Prior Publication Data

US 2012/0170186 A1 Jul. 5, 2012

(30) Foreign Application Priority Data

Dec. 31, 2010 (CN) .......................... 2010 1 0619637

(51) Int. Cl.
*G06F 1/16* (2006.01)
(52) U.S. Cl.
USPC .............. 361/679.3; 361/679.55; 361/679.56; 455/575.1; 455/575.4
(58) Field of Classification Search
USPC .......... 361/679.3, 679.55, 679.56; 455/575.4; 439/10
See application file for complete search history.

(56) References Cited

U.S. PATENT DOCUMENTS

| 7,448,872 | B2 * | 11/2008 | Im ................................... 439/10 |
| 7,872,861 | B2 * | 1/2011 | Ou et al. ................... 361/679.27 |
| 8,086,290 | B2 * | 12/2011 | Yoon et al. ................. 455/575.4 |
| 2007/0184882 | A1 * | 8/2007 | Kim ............................ 455/575.4 |
| 2010/0048263 | A1 * | 2/2010 | Wang et al. ................ 455/575.4 |
| 2010/0061049 | A1 * | 3/2010 | Shen ........................ 361/679.21 |
| 2010/0099467 | A1 * | 4/2010 | Lee ............................ 455/575.4 |
| 2011/0003624 | A1 * | 1/2011 | Jung et al. .................. 455/575.4 |
| 2011/0092259 | A1 * | 4/2011 | Liu et al. .................... 455/575.4 |

* cited by examiner

*Primary Examiner* — Anthony Q Edwards
(74) *Attorney, Agent, or Firm* — Altis Law Group, Inc.

(57) ABSTRACT

A sliding module includes a first section, a second section, a sliding plate, a rotary plate, a connecting rod, and at least one elastic member. The sliding plate is fixed to the first section. The rotary plate is rotatably connected to the second section, and the sliding plate is slidably connected to the rotary plate. The connecting rod is connected to the first section and the second section. One end of the at least one elastic member is fixed to the rotary plate, the other end of the at least one elastic member is fixed to the sliding plate. When the sliding plate and the first section slide relative to the second section, the connecting rod rotates the rotary plate relative to the second section, causing the first section to move and rotate relative to the second section into a tilted orientation.

12 Claims, 6 Drawing Sheets

SLIDING MODULE FOR ELECTRONIC DEVICE

BACKGROUND

1. Technical Field

The present disclosure generally relates to electronic devices, and particularly to a sliding module for an electronic device.

2. Description of Related Art

Portable electronic devices such as mobile phones, laptops, and personal digital assistants (PDAs) are widely used. As such, the sales and use of slide-type portable electronic devices have been on the increase. A slide-type portable electronic device has two housings, which can open and close relative to each other with the use of a slide mechanism.

However, the slide-type devices typically only allow the two housings to slide parallel to each other. Therefore, when the slide-type is placed horizontally, it can be difficult for users to view a display screen on the housing.

Therefore, there is room for improvement within the art.

BRIEF DESCRIPTION OF THE DRAWINGS

Many aspects of the tilt mechanism for electronic device can be better understood with reference to the following drawings. The components in the drawings are not necessarily to scale, the emphasis instead being placed upon clearly illustrating the sliding module for electronic device. Moreover, in the drawings, like reference numerals designate corresponding parts throughout the several views.

DETAILED DESCRIPTION

Figure 1:
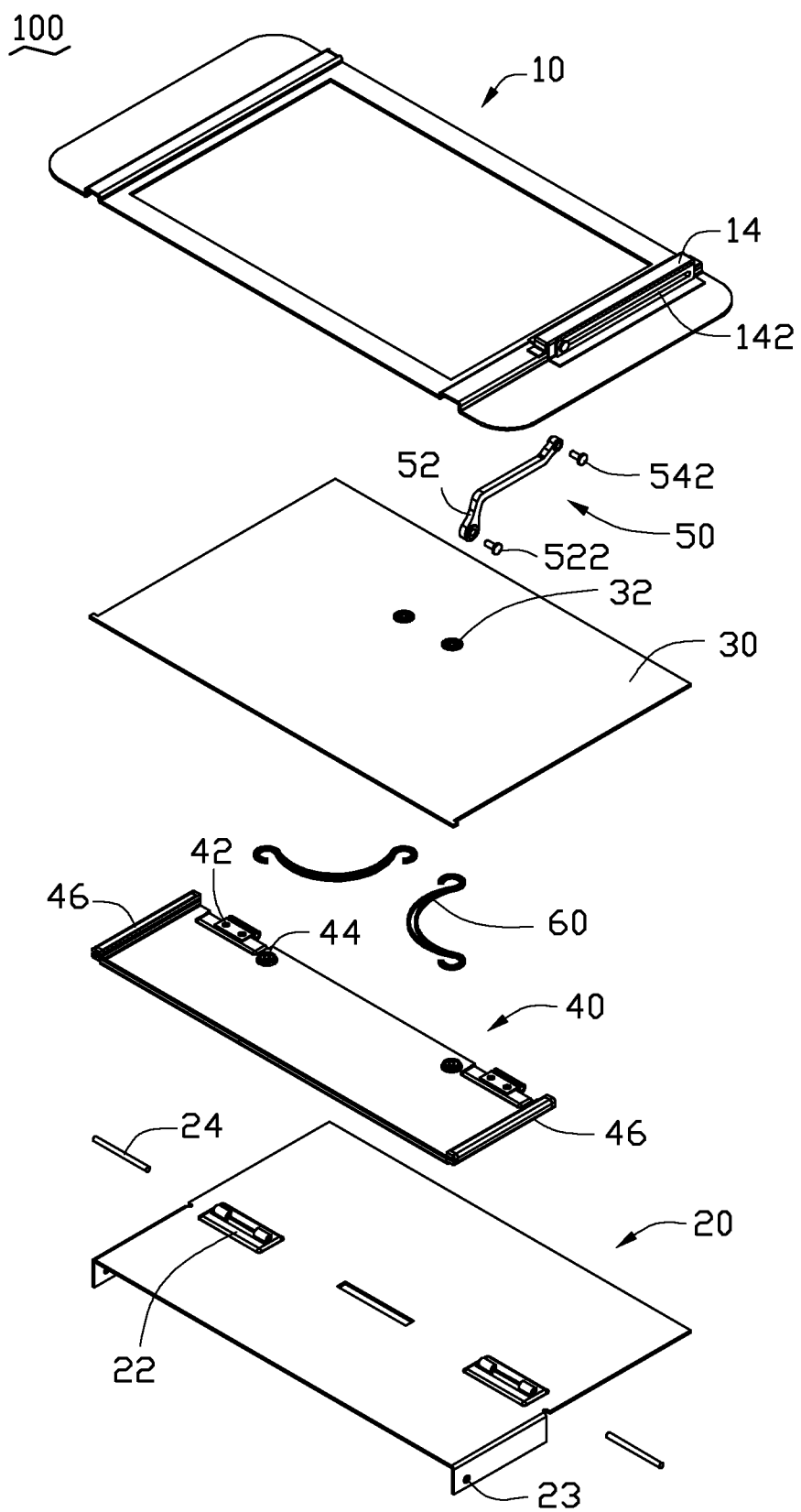
FIG. 1 is an exploded, isometric view of a sliding module according to an exemplary embodiment.
Figure 2:
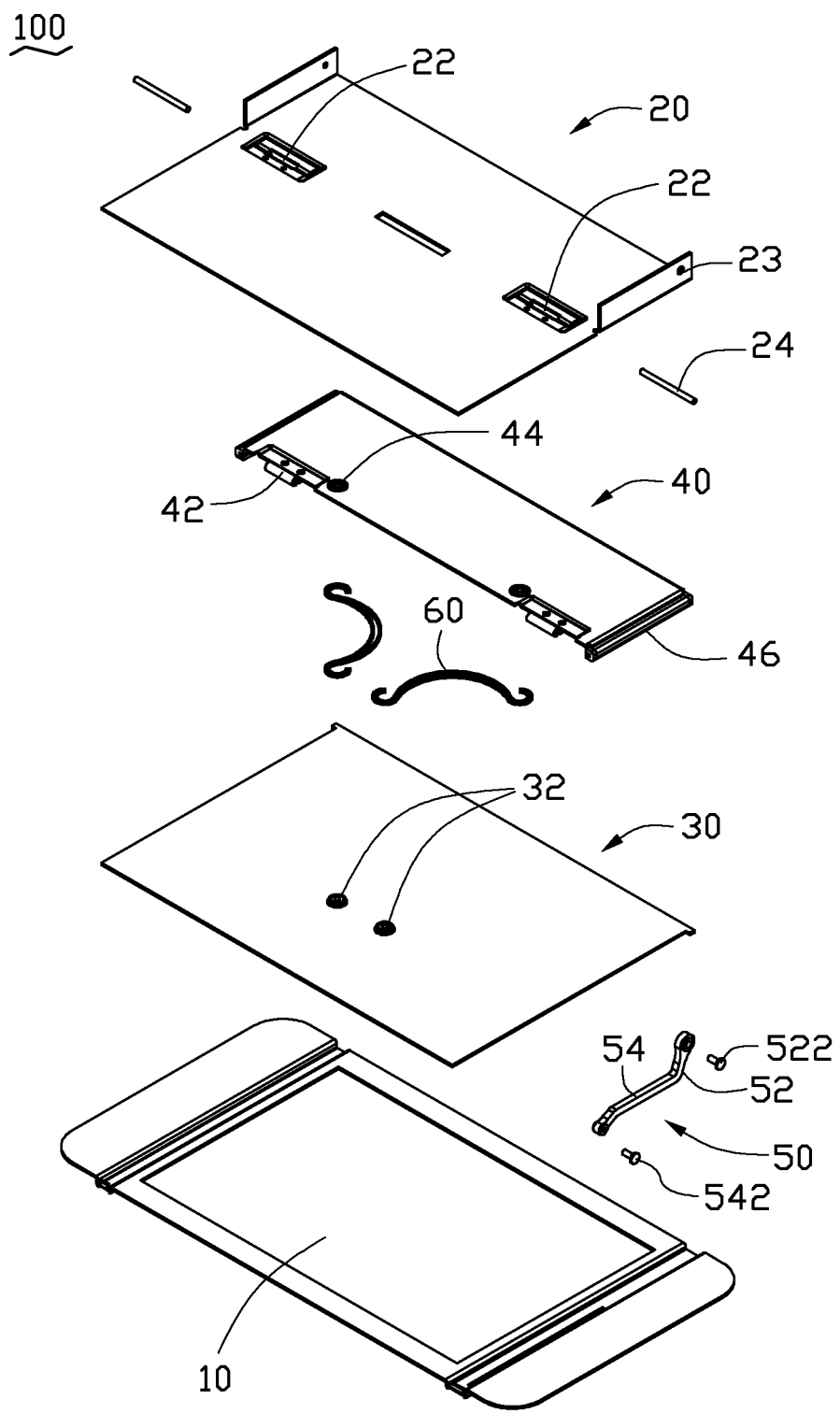
FIG. 2 is similar to FIG. 1, but shown from the other angle.

FIG. 1 and FIG. 2 show an exemplary embodiment of a sliding module 100 applied in an electronic device, such as a mobile phone, or a personal digital assistant. The sliding module 100 can be in a flat, closed orientation and a tilted, open orientation. The sliding module 100 includes a first section 10, a second section 20, a sliding plate 30, a rotary plate 40, a connecting rod 50, and two elastic springs 60. In the flat, closed orientation, the first section 10 and the second section 20 are parallel and overlap each other. In the tilted, open orientation, the first section 10 tilts relative to the second section 20 for better viewing.

The first section 10 has a mounted portion 14 positioned at one surface thereof. The mounted portion 14 defines a slot 142. One end of the connecting rod 50 can be slidably attached in the slot 142. One pair of pivot seats 22 is formed on a surface of the second section 20 for connecting to the rotary plate 40. In this exemplary embodiment, the pivot seats 22 are connected to one surface of the rotary plate 40 by shafts 24. A through hole 23 is defined in one surface of the second section 20 for connecting the other end of the connecting rod 50.

The sliding plate 30 may be fixed to or integral with the first section 10. Pins 32 are formed on the sliding plate 30 for connecting to one end of each elastic member 60.

At least one hinge portion 42 is formed on one surface of the rotary plate 40 for rotatably connecting the rotary plate 40 to the second section 20. In this exemplary embodiment, the rotary plate 40 has two opposite hinge portions 42. The hinge portions 42 are rotatably connected to the pivot seats 22 of the second section 20 by the shaft 24. Two pins 44 are formed on a surface of the rotary plate 40 adjacent to the hinge portions 42 for connecting to the other end of each elastic spring 60. The rotary plate 40 includes two guiding rails 46 at opposite sides thereof for slidably connecting to the edges of the sliding plate 30.

The connecting rod 50 includes a first arm 52 and a second arm 54 integrally formed together or assembled together. The first arm 52 is rotatably connected to the through hole 23 of the second section 20 with a screw 522. The second arm 54 is rotatably connected to the slot 142 of the mounted portion 14 of the first section 10 with a screw 542. The first arm 52 is at an angle relative to the second arm 54.

Each elastic spring 60 may be, e.g., a wire spring, a pressure spring, a torsion spring, or a spring plate etc. One end of each elastic spring 60 is mounted to one of the pins 32, and the other end of each elastic spring 60 is mounted to one of the pins 44. Thus, the elastic springs 60 are connected to the sliding plate 30 and the rotary plate 40.

In assembly, the rotary plate 40 is mounted to the second section 20, and the hinged portions 42 of the rotary plate 40 being rotatably connected to the pivot seats 22 of the second section 20 with the shafts 24. The sliding plate 30 is fixed to the first section 10, and the edges of the sliding plate 30 are slidably received in the guiding rails 46 of the rotary plate 40. One end of each elastic spring 60 is mounted to one of the pins 32, and the other end of each elastic spring 60 is mounted to one of the pins 44. The first arm 52 is rotatably connected to the through hole 23 of the second section 20 with the screw 522. The second arm 54 is rotatably connected to the slot 142 of the mounted portion 14 with the screw 542. Accordingly, the sliding module 100 is assembled.

Figure 3:
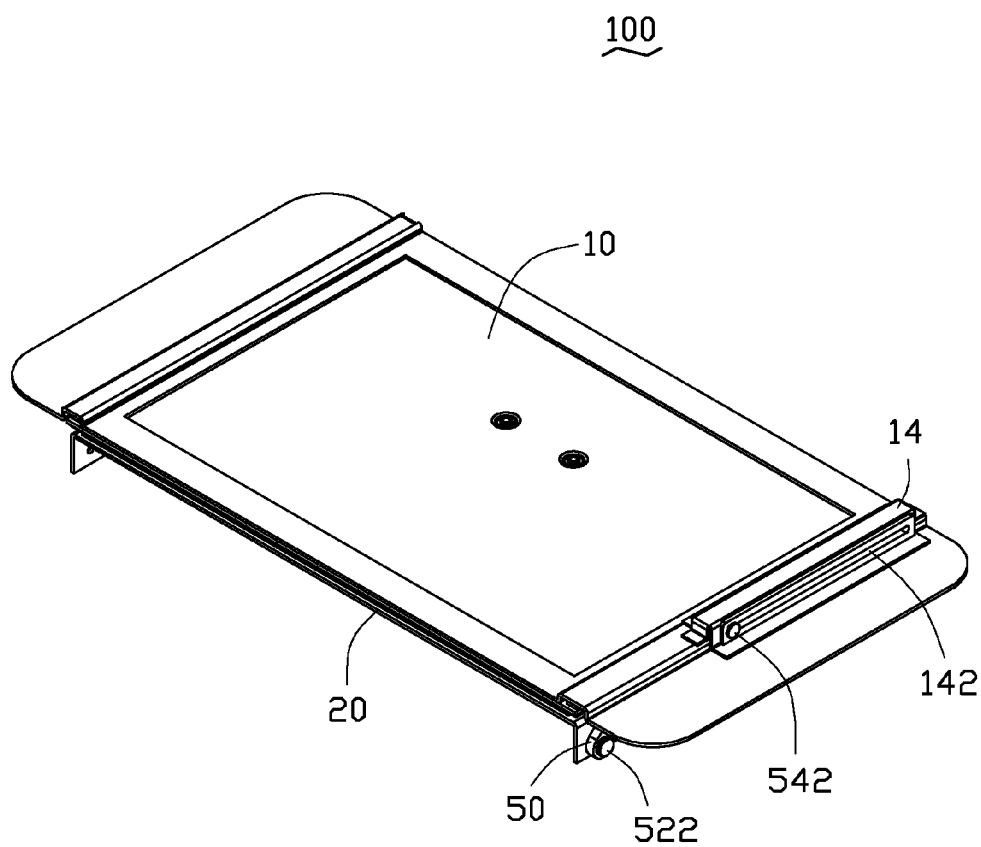
FIG. 3 is an isometric view of the sliding module of FIG. 1 in a flat, closed orientation.

Referring to FIG. 3, when the sliding module 100 is in a flat, closed orientation, the first section 10 is parallel to and overlaps the second section 20 under the limitation of the connecting rod 50 and the elastic springs 60.

Figure 4:
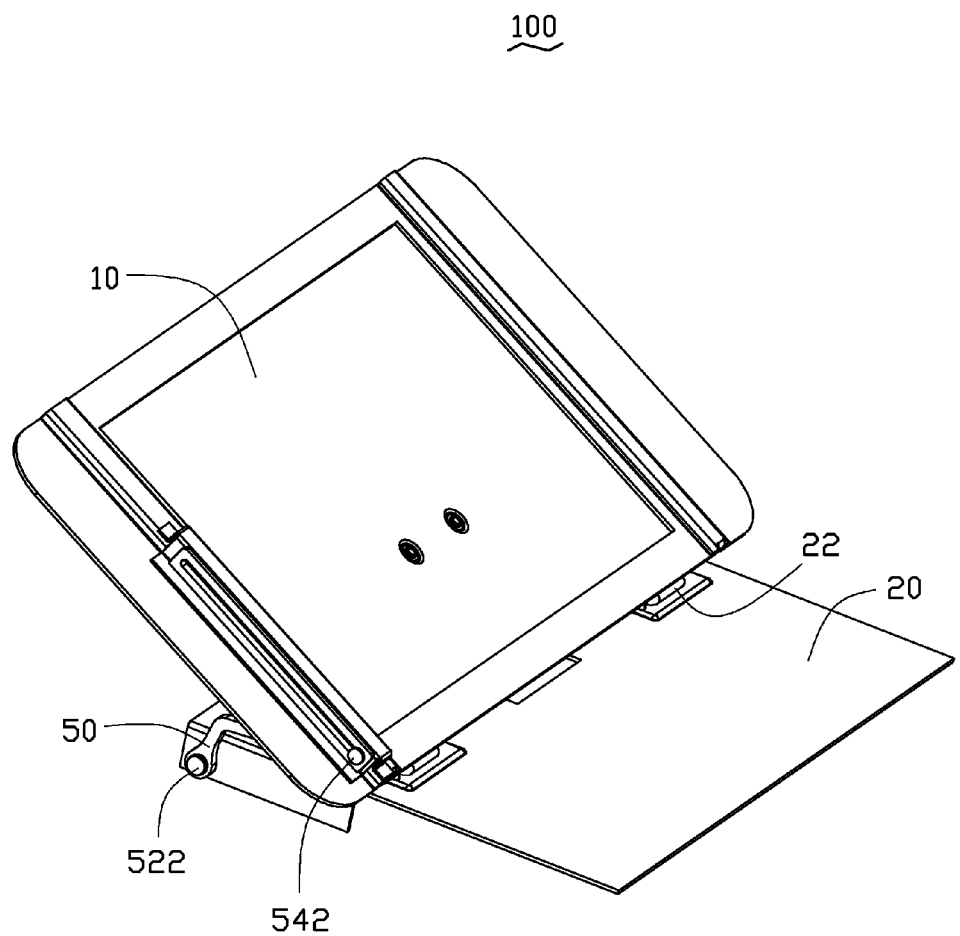
FIG. 4 is an isometric view of the sliding module of FIG. 3 in an open orientation.
Figure 5:
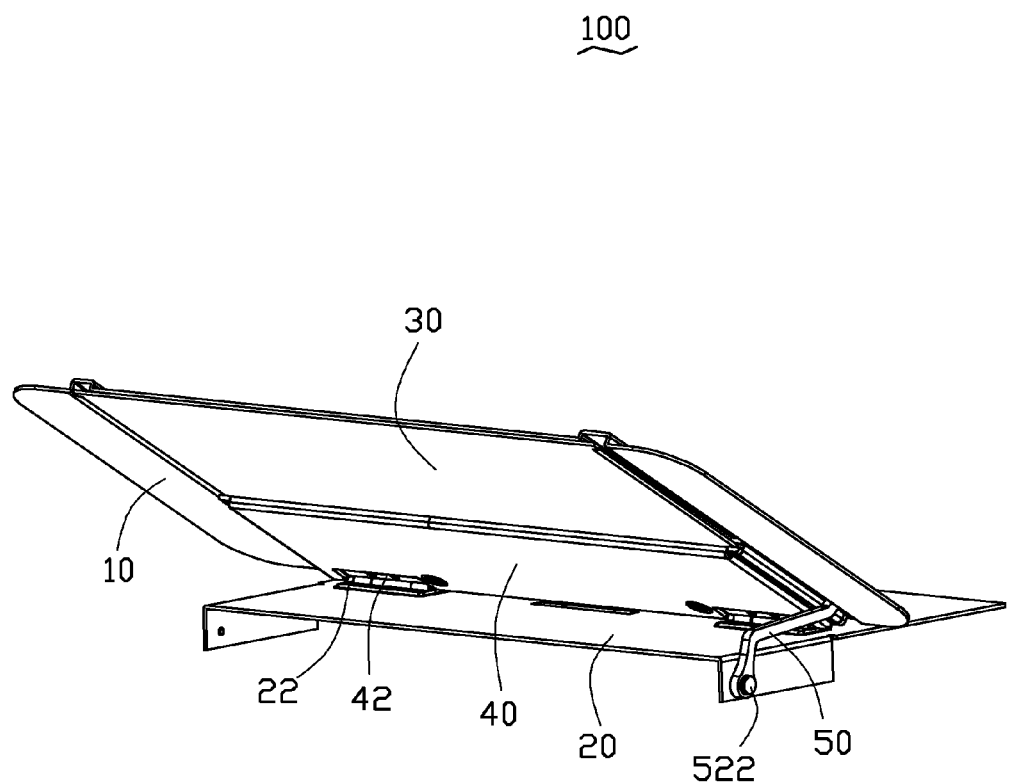
FIG. 5 is similar to FIG. 1, but shown from the other angle.

Referring to FIGS. 4 and 5, when the sliding module 100 is opened, a force is applied to the first section 10 to move the first section 10 away from the second section 20. The sliding plate 30 and the first section 10 slide relative to the second section 20, and the connecting rod 50 slides in the slot 142. When the connecting rod 50 slides to a distal end of the slot 142, the connecting rod 50 will rotate around the screw 522. Since the sliding plate 30 can only slide along the rotary plate 40 and the rotary plate 40 is rotatably connected to the second section 20, the connecting rod 50 elevates the rotary plate 40 to elevate the first section 10. Thus, the elastic springs 60 accumulate elastic energy until the sliding plate 30 slides to a position where the elastic springs 60 are compressed to a maximum deformation. After that, the sliding plate 30 can further automatically slide towards the open position by the returning of the elastic springs 60 from their compressed states to their original states. The first section 10 is supported in a tilted position relative to the second section 20.

Figure 6:
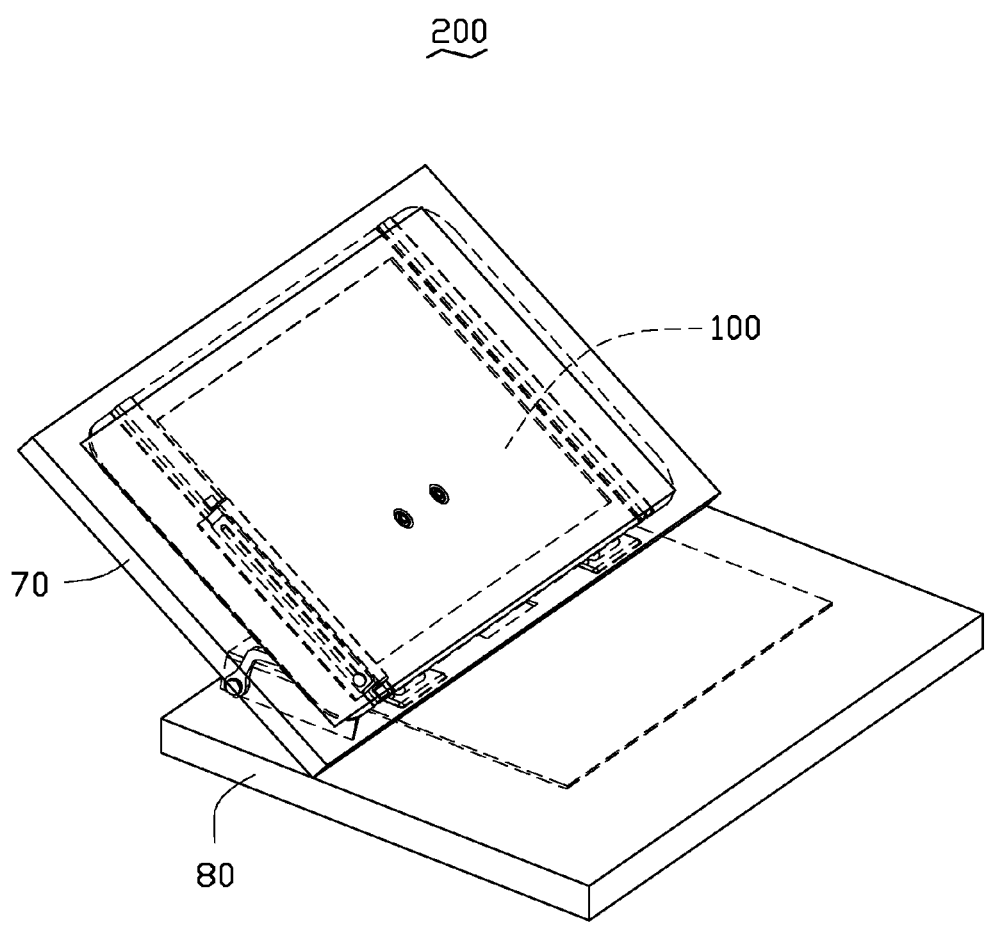
FIG. 6 is an isometric view of the sliding module applied in an electronic device.

Referring to FIG. 6, the sliding module 100 is applied in a portable electronic device 200 such as a mobile phone. The electronic device 200 includes a cover 70 and a housing 80 engagable with the cover 70. The cover 70 is secured to the first section 10, and the housing 80 is secured to the second section 20. Thus, the portable electronic device 200 opens or closes with the use of the sliding module 100.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A sliding module comprising:
    a first section;
    a second section;
    a sliding plate fixed to the first section;
    a rotary plate rotatably connecting the second section, the sliding plate slidably connected with the rotary plate;
    a connecting rod connecting the first section and the second section;
    at least one elastic member, one end of the at least one elastic member fixed to the rotary plate, the other end of the at least one elastic member fixed to the sliding plate; and
    wherein when the sliding plate and the first section slides relative to the second section, the connecting rod rotates the rotary plate relative to the second section, causing the first section to move and rotate relative to the second section into a tilted orientation.

2. The sliding module as claimed in claim 1, wherein the rotary plate includes a hinged portion at one surface thereof, the second section includes a pivot seat, and the hinged portion is connected to the pivot seat.

3. The sliding module as claimed in claim 1, wherein two opposite edges are formed at opposite sides of the sliding member, the rotary plate includes two guiding rails at opposite sides thereof for slidably connecting the edges of the sliding plate.

4. The sliding module as claimed in claim 1, wherein the first section has a mounted portion positioned at one surface thereof, the mounted portion defines a slot, and one end of the connecting rod is slidably attached to the slot.

5. The sliding module as claimed in claim 4, wherein a through hole is defined in one surface of the second section for connecting the other end of the connecting rod.

6. The sliding module as claimed in claim 5, wherein the connecting rod includes a first arm and a second arm, the first arm is rotatably connected to the through hole of the second section with a screw, the second arm is rotatably connecting the slot of the mounted portion of the first section with the other screw.

7. The sliding module as claimed in claim 6, wherein the first arm is at an angle relative to the second arm.

8. An electronic device comprising:
    a first section;
    a second section;
    a sliding plate fixed to the first section;
    a rotary plate rotatably connecting the second section, the sliding plate slidably connected with the rotary plate;
    a connecting rod connecting the first section and the second section;
    at least one elastic member, one end of the at least one elastic member fixed to the rotary plate, the other end of the at least one elastic member fixed to the sliding plate; and
    wherein when the sliding plate and the first section slides relative to the second section, the connecting rod rotates the rotary plate relative to the second section, causing the first section to move and rotate relative to the second section into a tilted orientation.

9. The electronic device as claimed in claim 8, wherein the first section has a mounted portion positioned at one surface thereof, the mounted portion defines a slot, and one end of the connecting rod is slidably attached to the slot.

10. The electronic device as claimed in claim 9, wherein a through hole is defined in one surface of the second section for connecting the other end of the connecting rod.

11. The electronic device as claimed in claim 10, wherein the connecting rod includes a first arm and a second arm, the first arm is rotatably connected to the through hole of the second section with a screw, the second arm is rotatably connected to the slot of the mounted portion of the first section with the other screw.

12. The electronic device as claimed in claim 8, wherein two opposite edges are formed at opposite sides of the sliding member, the rotary plate includes two guiding rails at opposite sides thereof for slidably connecting the edges of the sliding plate.

\* \* \* \* \*